(12) United States Patent
Ingle et al.

(10) Patent No.: US 8,783,842 B2
(45) Date of Patent: Jul. 22, 2014

(54) METHODS AND SYSTEMS FOR PRINTING ON NON-POROUS MEDIA

(75) Inventors: David Michael Ingle, San Diego, CA (US); Chandrasekhar Nadimpalli, Barcelona (ES); Phillip C. Cagle, San Marcos, CA (US); Britt Marie Christenson, San Diego, CA (US); Howard Doumaux, San Diego, CA (US); Marc Rossinyol Casals, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 161 days.

(21) Appl. No.: 13/617,497

(22) Filed: Sep. 14, 2012

(65) Prior Publication Data
US 2014/0078217 A1    Mar. 20, 2014

(51) Int. Cl.
*B41J 2/01* (2006.01)
*B41J 2/21* (2006.01)
*C09D 11/00* (2014.01)

(52) U.S. Cl.
CPC ...... *B41J 2/2114* (2013.01); *B41J 2/21* (2013.01); *B41J 2/2107* (2013.01); *C09D 11/005* (2013.01)
USPC .............................. 347/96; 347/100

(58) Field of Classification Search
CPC .......... B41J 2/21; B41J 2/2107; B41J 2/2114; C09D 11/005; C09D 11/30; C09D 11/322; C09D 11/40; C09D 11/54
USPC .............. 347/5, 14, 95–100; 106/31.13, 31.6; 523/160, 161
See application file for complete search history.

(56) References Cited

U.S. PATENT DOCUMENTS

| | | | |
|---|---|---|---|
| 6,156,384 A | 12/2000 | Hutter et al. | |
| 6,786,588 B2 | 9/2004 | Koyano et al. | |
| 6,833,008 B2 | 12/2004 | Nitzan et al. | |
| 6,906,019 B2 | 6/2005 | Nitzan et al. | |
| 7,621,631 B2 * | 11/2009 | Tsao | 347/102 |
| 7,682,012 B2 * | 3/2010 | Jackson | 347/100 |
| 7,696,262 B2 * | 4/2010 | Cagle et al. | 523/160 |
| 2006/0023044 A1 * | 2/2006 | Bauer | 347/100 |
| 2006/0170746 A1 * | 8/2006 | Jackson | 347/100 |
| 2009/0073246 A1 * | 3/2009 | Makuta et al. | 347/100 |
| 2010/0231671 A1 | 9/2010 | Anton et al. | |
| 2011/0303113 A1 | 12/2011 | Sarkisian et al. | |

* cited by examiner

*Primary Examiner* — Matthew Luu
*Assistant Examiner* — Rut Patel

(57) ABSTRACT

The present disclosure provides a method of inkjet printing on non-porous media including inkjet printing a fixer fluid on the non-porous media and inkjet printing an ink onto the non-porous media, where the printing of the ink is within 125 milliseconds of the printing of the fixer fluid. Thus, the ink is printed to contact the fixer fluid within 125 milliseconds of each being printed. In one example, the fixer fluid can include a liquid vehicle including water and co-solvent having a boiling point from 160° C. to 250° C., a surfactant, and a cationic polymer; and the ink can comprise an anionic pigment dispersion.

17 Claims, No Drawings

METHODS AND SYSTEMS FOR PRINTING ON NON-POROUS MEDIA

BACKGROUND

Vinyl and other nonporous films are common substrates for signage and other printing applications. Inkjet printing with aqueous inks is increasingly being used to print on these media. It is recognized that inkjet printing of aqueous inks on nonporous media is substantially different than inkjet applications for traditional porous paper-based media. On porous papers, ink drying occurs primarily by ink penetration into the media pore structure, and control of image quality aspects is a strong function of the rate of ink penetration into the media. Thus, optimization of the penetration rate is used for attributes such as optical density and color-to-color bleed. On nonporous media, there is no penetration of the ink into the media, i.e. the colorant remains on the surface of the media, and image quality defects resulting from wetting and ink migration across the nonporous surface are more difficult to control, especially at high printing speeds.

As such, improvements to inkjet inks and related fluids for non-porous media would be an advancement in the art.

DETAILED DESCRIPTION

It has been recognized that a printing method utilizing an ink and a fixer fluid can provide faster printing with good printing characteristics on non-porous media. In accordance with this, printing a fixer fluid and an ink in rapid succession, e.g., such as on the same printing pass, within a specific time can provide good print quality, even when printed rapidly, as compared to traditional printing techniques. It is noted that when discussing the present methods, each of these discussions can be considered applicable to each of these embodiments, whether or not they are explicitly discussed in the context of that embodiment. Thus, for example, in discussing a fixer fluid in a printing method, such a fixer fluid can also be used in a printing system, and vice versa.

Generally, fixer fluids can be used to control image quality, bleed, and coalescence on porous media by modifying the colorant penetration rate. However, fixer fluids designed for porous media do not give acceptable performance on nonporous media due to a number of factors: a) poor wetting and image quality control on low surface energy nonporous substrates such as vinyl, b) poor durability of the image (wet and rub resistance), and/or c) poor lightfastness in outdoor conditions. It has also been recognized that a fixer fluid and ink can be designed for non-porous substrates and can be printed utilizing a method that provides for good image quality, durability, and lightfade. The method can also be used to increase the printing speed. One method to control image quality on nonporous media is the use of heated drying. In a typical configuration, the printer contains two heated zones: a print zone and a curing zone. The print zone is the imaging area where the ink is applied. The print zone is heated to evaporate water in order to control image quality. The curing zone further evaporates water and then volatile co-solvent in order to dry and cure the ink film.

The heated print zone can be used in combination with multi-pass scanning print modes, which typically includes printing an image stepwise using multiple passes of a scanning inkjet print head. For example, in a 10-pass print mode, the total ink could be applied in 10 passes of 10% density each to give an image with 100% ink. Likewise, with a 4-pass print mode, the total ink could be applied in 4 passes of 25% density each to give an image with 100% ink. Multi-pass print modes with lower ink densities per print head pass allow more facile evaporation and viscosification of the ink with the heating system, limiting ink flow on the printed media and enabling high image quality, but the more passes used to apply the ink, the slower the overall printing speed.

It has been recognized that this method suffers from the need for dedicated heating systems in the printing zone, where the heating systems have high power demands and the resulting high temperatures can impact printhead reliability and damage sensitive media. Slow print modes are also often used to limit ink per unit area during the drying stage, leading to low overall printing speeds. The use of a fixer solution, as described herein, has been found to reduce or eliminate the printzone heat needed to control image quality (IQ), and can provide greater printing speeds, as measured by reducing the number of passes of the printhead to achieve acceptable image quality.

To further increase the printing speed, it has been discovered and described herein that certain methods to best combine the ink and fixer on the printed page can be beneficial. For example, it has been discovered that both the sequence and the timing of printing a fixer fluid and ink can be improve performance, and underprinting the fixer within a very short time frame of printing the ink can provide printing benefits otherwise not achieved with other application methods. This method allows wet-on-wet combination of the ink and fixer, and minimizes the migration time of the colorant prior to fixation.

With the above in mind, a method of inkjet printing on non-porous media can comprise inkjet printing a fixer fluid on the non-porous media and inkjet printing an ink onto the non-porous media, where the printing of the ink is within 125 milliseconds of the printing of the fixer fluid. The fixer is typically printed before the ink, although both the ink and fixer fluid can be printed substantially simultaneously. Thus, the ink is printed to contact the fixer fluid within 125 milliseconds of inkjet printing.

The fixer fluid can comprise a liquid vehicle including water and co-solvent, a surfactant, and a cationic polymer where the fixer fluid is formulated for printing on non-porous media. As used herein, the term "cationic polymer" refers to an ionic polymer where the specific ions are cationic in nature, e.g. a quaternized polyamine, as discussed in more detail below.

More specifically, the fixer fluid generally comprises a liquid vehicle, a surfactant, and a cationic polymer, where the liquid vehicle includes water and co-solvent. The co-solvent has a boiling point from 160° C. to 250° C. and is generally present in an amount of 1 wt % to 40 wt % such that the fixer fluid is formulated for printing on non-porous media. Also, the fixer fluid does not include more than 5 wt % volatile co-solvent, where "volatile" is defined as a solvent having a boiling point lower than 160° C., and also does not include more than 3 wt % non-volatile co-solvent, hereby defined as a solvent having a boiling point greater than 250° C. Water is not considered to be a co-solvent, as defined herein, but is in addition to the co-solvents of the present disclosure. In one specific aspect, the fixer fluid can include multiple co-solvents having a boiling point ranging from 160° C. to 250° C. In another example, the liquid vehicle can be devoid of non-volatile co-solvent. In still another example, the liquid vehicle can be devoid of volatile co-solvent.

In one example, co-solvents with a boiling point from 160° C. to 250° C. can include the following: propylene glycol n-butyl ether; ethylene glycol n-butyl ether; 2,3-butanediol; 1,2-propanediol; propylene glycol; dipropylene glycol methyl ether; 1,2-butanediol; diethylene glycol methyl ether;

ethylene glycol; 2-methyl-2,4-pentanediol (hexylene glycol); 2,4-pentanediol; n-methylpyrollidinone; n-ethylpyrollidinone; diethylene glycol ethyl ether; 1,3-butanediol; 3,5-dimethyl-3-hexyne-2,5-diol; 1,2-pentanediol; ethylene glycol n-hexyl ether; 2,2-dimethyl-1,3-propanediol; dipropylene glycol t-butyl ether; 2-methyl-1,3-propanediol (MPdiol); dipropylene glycol n-propyl ether; 1,3-propanediol; 2,5-dimethyl-2,5 hexanediol; 2,5-hexanediol; 1,2-hexanediol; 1,4-butanediol; dipropylene glycol n-butyl ether; diethylene glycol n-butyl ether; 2,2,4-trimethyl-1,3-pentanediol (TMPD glycol); 1,5-pentanediol; 2-ethyl-1,3-hexanediol; tripropylene glycol methyl ether; propylene glycol phenyl ether; ethylene glycol phenyl ether; di(ethylene glycol); di(propylene glycol); 2-pyrollidinone; triethylene glycol methyl ether; and mixtures thereof. Other co-solvents can be used above or below the 160° C. to 250° C. boiling point range, provided that the total loading above this range is less than 3 wt %, and below this range is less than 5 wt %.

As discussed herein, the printing of the fixer fluid and the ink can be performed within a specific time frame, e.g., within 125 milliseconds as discussed herein. In one aspect, the printing of the ink can be within 100 milliseconds of the printing of the fixer fluid. In another aspect, the printing of the ink can be within 50 milliseconds of the printing of the fixer fluid. In another aspect, the printing of the ink can be within 25 milliseconds of the printing of the fixer fluid. Additionally, when describing printing within 125, 100, 50, or 25 milliseconds of one another, it is understood that the ink and fixer fluid are printed to contact one another within these time frames.

Generally, the fixer fluid is applied by inkjet printing and is formulated to print onto non-porous media. As such, in one example, the fixer fluid can be formulated with ratios of co-solvents, surfactants, and cationic polymers such that the fixer fluid can uniformly wet vinyl and other non-porous media with surface energies lower than 40 dynes/cm, as measured by the ASTM D2578 method.

Generally, the fixer fluid is formulated so that when combined with an ink on the media, the combination of the two after drying provides an image with acceptable durability. Durability test methods include tape adhesion (ASTM 3359 method), fingernail scratch resistance, Taber dry rub abrasion resistance, and wet rub resistance toward water, co-solvent, and cleaning solutions. The printed image can also retain outdoor weatherability toward light fade and other defects, as measured by the SAE J2527 method.

Additionally, the fixer fluid can be applied by inkjet printing on the nonporous media only in areas covered by the ink. This imagewise method eliminates two major issues with fixer applied as a uniform coating on the media. First, fixer fluidic efficiency is increased, reducing the raw material cost per page, and minimizing the amount of fluid that is to be dried by a drying system, which helps lower drier power settings and allows increased printing speeds. Second, the fixer alone need not have high durability in order to avoid damage or transfer in un-inked areas of the image.

The present printing methods can allow for faster printing onto non-porous media. In one example, the printing of the ink is at a flux of 1 to 14 mL/hour per inch$^2$ of swath area (printer length×swath width in inches). In another example, the printing of the fixer fluid and the ink can be at a printzone temperature of less than 55° C. In one aspect, the temperature can be less than 45° C., and in one specific aspect, less than 30° C.

The fixer fluid and ink can be printed in specific ratios to control gloss. In one example, the fixer fluid and the ink can be printed in a ratio of 6:100 to 30:100 by weight, depending on the fixer and ink vehicle relative compositions. As used herein, "gloss" refers generally to the amount of light reflected by an object's surface, e.g., an inkjet media surface. Gloss can be quantified and measured relative to specific specular angles from an object surface. The specular angle is the angle equal to but opposite the angle of incidence. This specular light is responsible for the highlights visible on shiny materials. When quantifying gloss, it can be measured at angles of 20°, 60°, and 85° off of the normal. Gloss measurements are indicated by gloss units in relation to the angle used for measurement. In one specific example, as used herein, "60° gloss" is the gloss of an image measured by using "BYK-Gardner micro-TRI-gloss" meter with incident angle set at 60°.

In the printer, the volume of fixer fluid applied is generally determined by the amount of ink used for the specified image. Specific ratios of ink and fixer are dependent on the specific chemistry and concentration of both the cationic polymer in the fixer and the anionic components in the ink. The volume of fixer used is a function of the micromoles per liter of anionic charge from the ink relative to the micromoles per liter of cationic charge from the fixer. The volume of fixer applied contains sufficient cationic charge that charge neutralization of the anionic equivalents in the ink occurs, leading to flocculation of the pigment particles. The particle aggregation minimizes ink flow on the media surface and subsequent ink defects in the printed image (although other mechanisms beyond this charge neutralization mechanism can also be envisioned). Combinations of ink and fixer substantially above or below the point of zero charge afford poorer fixation of the ink.

The ratios are controlled by the amount of ink and fixer printed on the media, the charge density of the cationic and anionic moieties in the fixer and ink, and the loadings of the cationic and anionic materials in the fixer and the ink. It has been found that there are specific mixing ranges of fixer and ink that function to control image quality; and specific ranges that do not. In one example, the volume of fixer printed can be based on the amount of ink so that the total cationic equivalents of ionic change is equivalent to a factor X multiplied by the anionic equivalents of the ink, where X is from 0.1 to 10. In one aspect, X can be from 0.5 to 3.

Polymeric cationic polymers, also referred to as cationic polyelectrolytes, contain either guanidinium or fully quaternized ammonium functionalities, such as quaternized polyamine copolymers. In one example, the cationic polymer does not contain primary or secondary ammonium functionalities, such as polyallylamine or polyethylene imine, due to yellowing issues in outdoor exposure. Generally, the weight average molecular weight ($M_w$) of the cationic polymer allows viscosity less than 25 cP at 25° C., as measured on a Brookfield viscometer. Typical $M_w$ are less than 500,000, and in one aspect, less than 50,000. In one example, cationic polymers can have high charge densities to improve fixing efficiencies. As such, cationic charge densities can be higher than 1000 microequivalents per gram cationic functionality. In one aspect, higher than 4000 microequivalents per gram. Additionally, concentrations can be low to avoid regulatory issues with aquatic toxicity: range 0.1 wt % to 25 wt %, and in one aspect, 1 wt % to 2.5 wt %.

Classes of cationic polymers that can be used include, but are not limited to, quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof. It is to be understood that one or more polycations may be used, and that any desirable combination of the polycations can be used. One or more ions of the cationic polyelectrolytes may be ion-exchanged for a nitrate, acetate, mesylate, or other ion. As a non-limiting example, one typical material is Floquat® FL2350, a quaternized polyamine derived from epichlorohydrin and dimethyl amine, commercially available from SNF Inc.

As used herein, "liquid vehicle" "refers to the liquid fluid in which a cationic polymer is placed to form the fixer fluid. As used herein, "ink vehicle" refers to the liquid fluid in which a colorant and/or anionic components are placed to form the ink. Liquid vehicles and ink vehicles are well known in the art, and a wide variety of such vehicles may be used with the methods of the present disclosure. Such vehicles may include a mixture of a variety of different agents, including, surfactants, solvents, co-solvents, anti-kogation agents, buffers, biocides, sequestering agents, viscosity modifiers, surface-active agents, and/or water, etc. Though not part of the vehicle per se, in addition to the colorants, the vehicle can carry solid additives such as polymers, latexes, UV curable materials, plasticizers, pigments, etc. Additionally, the term "aqueous liquid vehicle," "aqueous ink vehicle," or "aqueous vehicle" refers to a vehicle including water. In one aspect, water can comprise a majority of the vehicle. It is noted that the term "liquid vehicle" is a broad term that includes both "non-aqueous vehicle" as well as "aqueous vehicle."

Inks for use with the cationic fixer are generally anionic in nature. In one example, the ink can comprise an anionic pigment dispersion and a latex. Additionally, the ink can include colorants, surfactants, co-solvents, and other vehicle components as described herein. As used herein, "anionic" refers to inks containing pigment dispersions containing ionic dispersing groups with a substantially anionic charge, or other anionic components such as polymers or surfactants, where the anionic functionality is provided by carboxylate, phosphate, or similar chemical functional groups.

Furthermore, as used herein, "pigment" generally includes pigment colorants, magnetic particles, aluminas, silicas, and/or other ceramics, organo-metallics or other opaque particles. In one example, the colorant can be a pigment. In one aspect, the colorant can be a pigment that imparts color. As discussed herein, the ink can include an anionic pigment dispersion. In one example, the anionic pigment dispersion can comprise a self-dispersed pigment. In another example, the anionic pigment dispersion can comprise a pigment dispersed with an anionic surfactant. In still another example, the anionic pigment dispersion can comprise a pigment dispersed with an anionic polymer.

In addition to the above, the present inks and/or fixers can further comprise a latex. As used herein, "latex" or "latex particulate" refers to discrete polymeric masses dispersed in a fluid, e.g., water.

The monomers used in the latexes can be vinyl monomers. In one example, the monomers can be selected from the group of vinyl monomers, acrylate monomers, methacrylate monomers, styrene monomers, ethylene, vinyl chloride, vinylidene chloride, maleate esters, fumarate esters, itaconate esters combinations thereof, and mixtures thereof. In one aspect, the monomers can include acrylates, methacrylates, and styrenes. Additionally, the monomers can include hydrophilic monomers including acid monomers, and hydrophobic monomers.

Monomers that can be polymerized in forming the latex particulates include, without limitation, styrene, p-methyl styrene, α-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam combinations thereof, derivatives thereof, and mixtures thereof.

Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof. Regarding the latex particulates, the latexes can have various particle sizes, and molecular weights. In one example, the latex particulates may have a weight average molecular weight ($M_w$) of about 5,000 to about 500,000. In one aspect, the latex particulates can have a weight average molecular weight ($M_w$) ranging from about 100,000 to about 500,000. In some other examples, the latex resin has a weight average molecular weight of about 200,000 to 300,000.

Further, the average particle diameter of the latex particles can be from about 10 nm to about 1 μm; in some other examples, from about 10 nm to about 500 nm; and, in yet other examples, from about 100 nm to about 300 nm. The particle size distribution of the latex is not particularly limited, and either latex having a broad particle size distribution or latex having a mono-dispersed particle size distribution may be used. It is also possible to use two or more kinds of latex particles each having a mono-dispersed particle size distribution in combination.

Typical ink vehicle formulations described herein can include water, and can further include co-solvents present in total at from 0.1 wt % to 50 wt %, depending on the printing technique (e.g. jetting architecture), though amounts outside of this range can also be used. Further, for ink vehicle and fixer vehicles, additional non-ionic, cationic, and/or anionic surfactants can be present, ranging from 0.01 wt % to 10 wt %. Additionally, the balance of the ink vehicle and fixer vehicle formulations can include purified water, or other vehicle components known in the art, such as biocides, viscosity modifiers, materials for pH adjustment, sequestering agents, preservatives, and the like.

Generally classes of co-solvents that can be used for the present inks, and for the fixer fluids subject to the limitations discussed herein, can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

In addition to the above, a printing system for non-porous media can comprise a fixer fluid, as described here; an ink, as described herein; and a printer. Generally, the printer can be configured to print the fixer fluid within 125 milliseconds of printing the ink. In one example, the printer can be configured to print the fixer fluid within 100, 50, or even 25 milliseconds of printing the ink.

Consistent with the formulation of this disclosure, various other additives may be employed to enhance the properties of the ink composition and/or fixer composition for specific applications. Examples of these additives are those added to inhibit the growth of harmful microorganisms. These additives may be biocides, fungicides, and other microbial agents, which are routinely used in ink formulations and fixer formulations. Examples of suitable microbial agents include, but are not limited to, NUOSEPT® (Nudex, Inc.), UCAR-CIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate some embodiments of the present ink and fixer fluid compositions and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present compositions and methods have been described above with particularity, the following examples provide further detail in connection with what are presently deemed to be the acceptable embodiments.

Example 1

Inkjet Ink Preparation

An inkjet ink composition was prepared by admixing the compositional elements in the amounts listed in Table 1.

TABLE 1

| Compositional Elements | Ink (wt % actives) |
|---|---|
| 2-Pyrrolidinone | 16 |
| 2-Methyl-1,3-propanediol | 9 |
| Crodafos N3 Acid | 0.5 |
| Nonionic surfactant | 0.5 |
| Nonionic Fluorosurfactant | 0.75 |
| Potassium hydroxide to pH 8 | Var. |
| Suitable Inkjet Latex for Nonporous Media | 7 |
| Pigment (color) dispersion | 1.5 |
| Water | Balance |

Example 2

Fixer Preparation

A fixer composition jettable by a thermal inkjet printhead was prepared by admixing the compositional elements in the amounts listed in Table 2.

TABLE 2

| Compositional Elements | Fixer (wt % actives) |
|---|---|
| 2-Methyl-1,3-propanediol | 9.00 |
| 2-Pyrrolidinone | 16.00 |
| Nonionic Fluorosurfactant | 0.75 |
| Floquat ® FL2350 | 2.45 |
| Water | 69.71 |
| pH | 4 |

Example 3

Printing Characteristics

The inkjet ink of Example 1 and the fixer fluid of Example 2 were printed onto a nonporous self-adhesive vinyl (Avery Digital Graphics MPI 3100, available from Avery Dennison Corp.). Printing was done in unidirectional print mode. In one circumstance, fixer was applied before ink from 25 ms to 125 ms before ink in the same pen carriage pass; this was repeated at 0, 6 and 12% fixer (relative to ink density). To demonstrate the significance of the timing and sequence of printing the ink and fixer, other prints were done where the ink preceded fixer by 25 ms to 100 ms. The results of the printing are listed in Table 3.

TABLE 3

| | 6% Fixer | | 12% Fixer | |
| --- | --- | --- | --- | --- |
| 0% Fixer (Control) | Fixer Fluid Before Ink (25 to 125 ms) | Ink Before Fixer Fluid (25 to 100 ms) | Fixer Fluid Before Ink (25 to 125 ms) | Ink Before Fixer Fluid (25 to 100 ms) |
| Poor Coalescence Poor Bleed High Gloss Non-hazy | Good Coalescence Good Bleed Moderate Gloss Slightly Hazy | Poor Coalescence Poor Bleed Moderate Gloss Slightly Hazy | Good Coalescence Good Bleed Low Gloss Hazy | Poor Coalescence Poor Bleed Low Gloss Hazy |

Example 4

Ratio Balancing of Fixer to Ink

Scheme 1 shows a point of zero charge (PZC) calculated from the sum of the cationic equivalents present in a fixer plus the anionic equivalents in a cyan ink.

For cationic polymer loading, an amount of fixer fluid is used for image quality control. Bleed, area fill uniformity, and gloss control each utilize fixed ratios of ink and fixer, consistent with the anionic/cationic stoichiometry of the ink and fixer chemistries used, and fairly close to the PZC of the fixer/ink combination. For instance, a fixer with a cationic polymer loading of 0.5% printed at 8% fixer gives similar image quality to a fixer with a 1% cationic polymer loading printed at 4% fixer.

Low cationic polymer loadings are less effective if the amount of fixer added is not near the PZC. At lower cationic polymer levels, such as 0.2 wt % or less, fixation of the image was poor, regardless of the amount of fixer fluid applied to the image. At higher fixer fluid levels, typically greater than 28-32% fixer (0.8 drops/600 dpi fixer, 2.5 drops/600 dpi ink), good area fill uniformity does not occur due to increased dilution, or cationic charge reversal on the particles, even though the point of zero charge has been reached.

Scheme 1

μeq/g cationic charge in fixer: Cationic Polymer Loading

| 0.50 wt % | 1.00 wt % | 2.50 wt % | 3.50 wt % | 5.00 wt % |
| --- | --- | --- | --- | --- |
| 3633 | 7267 | 18167 | 25434 | 36335 |

Scheme 1

μeq/g anionic charge in ink: 2137
Charge annihilation: net charge after fixer addition to 100% ink, in μeq/g.
Net charge: total cationic charge minus total anionic charge.

| | Cationic Polymer Loading | | | | |
| --- | --- | --- | --- | --- | --- |
| % Fixer | 0.5 wt % | 1 wt % | 2.5 wt % | 23.5 wt % | 5 wt % |
| 0 | −2137 | −2137 | −2137 | −2137 | −2137 |
| 2 | −2064 | −1992 | −1774 | −1628 | −1410 |
| 4 | −1992 | −1846 | −1410 | −1120 | −684 |
| 6 | −1919 | −1701 | −1047 | −611 | 43 |
| 8 | −1846 | −1556 | −684 | −102 | 770 |
| 10 | −1774 | −1410 | −320 | 406 | 1496 |
| 12 | −1701 | −1265 | 43 | 915 | 2223 |
| 14 | −1628 | −1120 | 406 | 1424 | 2950 |
| 16 | −1556 | −974 | 770 | 1932 | 3677 |
| 18 | −1483 | −829 | 1133 | 2441 | 4403 |
| 20 | −1410 | −684 | 1496 | 2950 | 5130 |
| 22 | −1338 | −538 | 1860 | 3458 | 5857 |
| 24 | −1265 | −393 | 2223 | 3967 | 6583 |
| 26 | −1192 | −248 | 2586 | 4476 | 7310 |
| 28 | −1120 | −102 | 2950 | 4985 | 8037 |
| 30 | −1047 | 43 | 3313 | 5493 | 8763 |
| 32 | −974 | 188 | 3677 | 6002 | 9490 |
| % Fixer to reach PZC | 58.8 | 29.4 | 11.8 | 8.4 | 5.9 |

Example 5

Printing Throughputs for 3, 6, and 10 Pass Printing Systems

Determination of throughputs and parameters for 3, 6, and 10 pass printing systems are provided in Table 4:

TABLE 4

| | | | |
| --- | --- | --- | --- |
| # of carriage passes per swath | 3 | 6 | 10 |
| printer throughput (ft$^2$/h) | 430 | 215 | 151 |
| carriage swath width (in) | 1.66 | 1.66 | 1.66 |
| carriage speed (in/s) | 60 | 60 | 60 |
| swath width (in) | 60 | 60 | 60 |
| printed ink density (mL/ft$^2$) | 2.5 | 2.5 | 2.5 |
| printed ink flux (mL/h) | 1070 | 535 | 375 |
| swath area (in$^2$) | 99.6 | 99.6 | 99.6 |
| ink flux per swath area (mL/h/in2) | 10.7 | 5.4 | 3.8 |

As shown in Table 4, for multipass printing, the present methods and systems can be printed with a flux of 1 to 14 mL/hour per inch$^2$ of swath area.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A method of inkjet printing on non-porous media, comprising:
   inkjet printing a fixer fluid on the non-porous media, the fixer fluid comprising:
      a liquid vehicle including water and co-solvent having a boiling point from 160° C. to 250° C.,
      a surfactant, and
      a cationic polymer; and
   inkjet printing an ink onto the non-porous media, the ink comprising an anionic pigment dispersion;
   wherein ink is printed at a flux of 1 to 14 mL/hour per inch$^2$ of swath area to contact the fixer fluid within 125 milliseconds.

2. The method of claim 1, wherein the fixer fluid is underprinted with respect to the ink.

3. The method of claim 1, wherein the printing of the ink is within 50 milliseconds of the printing of the fixer fluid.

4. The method of claim 1, wherein the printing of the ink is within 25 milliseconds of the printing of the fixer fluid.

5. The method of claim 1, wherein the cationic polymer is present in the fixer fluid in an amount of 0.1 wt % to 25 wt % and the surfactant is present in the fixer fluid in an amount of 0.1 wt % to 10 wt %.

6. The method of claim 1, wherein the anionic pigment dispersion comprises a self-dispersed pigment, a pigment dispersed with an anionic surfactant, or a pigment dispersed with an anionic polymer.

7. The method of claim 1, wherein the fixer fluid and the ink is printed at a ratio of 6:100 to 30:100 by weight.

8. The method of claim 1, wherein the printing of the fixer fluid is selectively printed on the non-porous media in locations that also are printed with the ink.

9. The method of claim 1, wherein the co-solvent is present in the fixer fluid in an amount of 1 wt % to 40 wt %, and the fixer fluid does not include more than 5 wt % volatile co-solvent and does not include more than 3 wt % non-volatile co-solvent.

10. The method of claim 1, wherein the printing of the fixer fluid and the ink are at a temperature of less than 30° C.

11. A printing system for non-porous media, comprising:
   a fixer fluid, the fixer fluid comprising:
      a liquid vehicle including water and co-solvent having a boiling point from 160° C. to 250° C., the co-solvent present in the fixer fluid in an amount of 1 wt % to 40 wt %;
      a surfactant, the surfactant present in the fixer fluid in an amount of 0.1 wt % to 10 wt %; and
      a cationic polymer, the cationic polymer present in the fixer fluid in an amount of 0.1 wt % to 25 wt %;
   an ink, the ink comprising an anionic pigment dispersion and a latex; and
   a printer configured to overprint or underprint the fixer fluid within 125 milliseconds of printing the ink at a flux of 1 to 14 mL/hour per inch$^2$ of swath area, and wherein the printing is configured to print at a temperature of less than 55° C.

12. The printing system of claim 11, wherein the printer is configured to print the fixer fluid within 25 milliseconds of printing the ink.

13. The printing system of claim 11, wherein the liquid vehicle contains at least one co-solvent selected from the group of: propylene glycol n-butyl ether; ethylene glycol n-butyl ether; 2,3-butanediol; 1,2-propanediol; propylene glycol; dipropylene glycol methyl ether; 1,2-butanediol; diethylene glycol methyl ether; ethylene glycol; 2-methyl-2,4-pentanediol (hexylene glycol); 2,4-pentanediol; n-methylpyrollidinone; n-ethylpyrollidinone; diethylene glycol ethyl ether; 1,3-butanediol; 3,5-dimethyl-3-hexyne-2,5-diol; 1,2-pentanediol; ethylene glycol n-hexyl ether; 2,2-dimethyl-1,3-propanediol; dipropylene glycol t-butyl ether; 2-methyl-1,3-propanediol (MPdiol); dipropylene glycol n-propyl ether; 1,3-propanediol; 2,5-dimethyl-2,5 hexanediol; 2,5-hexanediol; 1,2-hexanediol; 1,4-butanediol; dipropylene glycol n-butyl ether; diethylene glycol n-butyl ether; 2,2,4-trimethyl-1,3-pentanediol (TMPD glycol); 1,5-pentanediol; 2-ethyl-1,3-hexanediol; tripropylene glycol methyl ether; propylene glycol phenyl ether; ethylene glycol phenyl ether; di(ethylene glycol); di(propylene glycol); 2-pyrollidinone; triethylene glycol methyl ether; and mixtures thereof and wherein the cationic polymer is selected from the group of quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof.

14. The printing system of claim 11, wherein the fixer fluid comprises multiple co-solvents having a boiling point from 160° C. to 250° C. present in a combined amount of 5 wt % to 30 wt %, and the cationic polymer is present in the fixer fluid at a concentration of 1 wt % to 5 wt % and has a cationic charge density higher than 1000 microequivalents per gram cationic functionality.

15. The printing system of claim 11, wherein the anionic pigment dispersion comprises a self-dispersed pigment, a pigment dispersed with an anionic surfactant, or a pigment dispersed with an anionic polymer; and the latex includes polymerized monomers selected from the group of: styrene, p-methyl styrene, α-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, combinations thereof, derivatives thereof, and mixtures thereof.

16. The printing system of claim 11, wherein the printer is configured to overprint or underprint the fixer fluid at a fixer fluid to ink ratio of 6:100 to 30:100 by weight.

17. The printing system of claim 11, wherein the printer is configured to overprint or underprint the fixer fluid on the non-porous media in locations that also are printed with the ink.

* * * * *

UNITED STATES PATENT AND TRADEMARK OFFICE
CERTIFICATE OF CORRECTION

| | |
|---|---|
| PATENT NO. | : 8,783,842 B2 |
| APPLICATION NO. | : 13/617497 |
| DATED | : July 22, 2014 |
| INVENTOR(S) | : David Michael Ingle et al. |

It is certified that error appears in the above-identified patent and that said Letters Patent is hereby corrected as shown below:

IN THE CLAIMS:

In column 12, lines 5-6, in Claim 13, delete "n-methylpyrollidinone;" and insert -- n-methylpyrrolidone; --, therefor.

In column 12, line 6, in Claim 13, delete "n-ethylpyrollidinone;" and insert -- n-ethylpyrrolidone; --, therefor.

In column 12, line 11, in Claim 13, delete "2,5 hexanediol;" and insert -- 2,5-hexanediol; --, therefor.

In column 12, line 17, in Claim 13, delete "2-pyrollidinone;" and insert -- 2-pyrrolidinone; --, therefor.

In column 12, line 23, in Claim 13, delete "vinylimidizol" and insert -- vinylimidazole --, therefor.

Signed and Sealed this
Thirteenth Day of January, 2015

Michelle K. Lee
*Deputy Director of the United States Patent and Trademark Office*